March 1, 1966 G. W. SIOLES ETAL Re. 25,975

TONE ARM AND CARTRIDGE ASSEMBLY

Original Filed July 19, 1960

INVENTORS
GEORGE W. SIOLES
ALFRED L. DIMATTIA
BY BENJAMIN B. BAUER

Austin & Seery
ATTORNEYS

United States Patent Office

Re. 25,975
Reissued Mar. 1, 1966

25,975

TONE ARM AND CARTRIDGE ASSEMBLY

George W. Sioles, Palos Verdes Estates, Calif., and Alfred L. Di Mattia, Fairfield, and Benjamin B. Bauer, Stamford, Conn., assignors, by mesne assignments, to Zenith Radio Corporation, Chicago, Ill., a corporation of Delaware Original No. 3,074,726, dated Jan. 22, 1963, Ser. No. 43,846, July 19, 1960. Application for reissue May 7, 1963, Ser. No. 279,046
16 Claims. (Cl. 274—23)

Matter enclosed in heavy brackets [ ] appears in the original patent but forms no part of this reissue specification; matter printed in italics indicates the additions made by reissue.

The present invention relates to an electro-mechanical transducer assembly for playback of sound records or discs, and in particular to an improved tone arm and cartridge assembly.

A typical tone arm and cartridge assembly used in a turn-table type of phonograph suitable for single-record play and in an automatic changer type of phonograph for multiple-record play includes an elongated tone arm which is mounted adjacent its rearward end for pivotal movement about a substantially horizontal tone arm axis. The tone arm carries a cartridge disposed within the forward end thereof having one or more styli adapted to selectively track in the record groove for playback of the record or disc. The cartridge or pickup is usually rigidly mounted in the tone arm, although it has been suggested that such cartridge may be flexibly or resiliently mounted for the purpose of affording at least some shock isolation of the cartridge from the tone arm. In such tone arm and cartridge assembly, it is important to afford some protection for the cartridge, which is usually of a relatively fragile and critical construction, against impacting or jarring, to assure high fidelity reproduction of records. Periodic or continued impacting or jarring of the phonograph and of the cartridge often results in misalignment of the components of the cartridge and/or damage to the one or more styli, and results in less than optimum performance of the cartridge and a corresponding loss of fidelity. Further, it is desirable to afford some protection of the records or discs against impact which is likely to cause breakage, scratching, marring or alterations in the groove characteristics which will make such records completely useless or at least not suitable for high quality playback of the recorded information.

Broadly, it is an object of the present invention to provide an improved tone arm and cartridge assembly realizing one or more of the aforesaid objectives. Specifically, it is within the contemplation of the present invention to provide an mproved tone-arm and cartridge assembly capable of producing high fidelity reproduction of both monophonic and stereophonic recordings of sound and which affords some protection of the cartridge and/or records against damage from jarring or shocking of the phonograph, and/or of the tone arm.

More specifically, the tone arm and cartridge assembly should be designed to afford effective isolation from spurious motion components imparted to the phonograph, and in particular to the tone arm and cartridge, which vertical motion components are caused by random vibration, instability in the mounting for the phonograph, shock excitation and other external forces. Further, it is desirable that the cartridge itself be protected against damage incident to accidental dropping of or pressing down on the tone arm in the direction of the record. Conversely, it is desirable that minimum damage occur to the record incident to the dropping or pressing down of the tone arm, since even the slightest imperfections caused in the record manifest themselves in poor quality sound reproduction. Still further, provision should be made to minimize the possibility of random and unwanted modulation of the recorded program material as might occur when the cartridge and stylus are excited by external vibrations.

Accordingly, it is a further object of the present invention to provide an improved tone arm and cartridge assembly which affords effective isolation of spurious vertical motion components applied to the phonograph and the cartridge to improve the fidelity of record playback.

It is a still further object of the present invention to provide an improved cartridge and tone arm assembly wherein the cartridge and the record are somewhat protected against damage incident to dropping of or pressure placed upon the tone arm incident to the use of the phonograph.

*In accordance with the invention, in a phonograph for reproducing sound from a grooved record, there is provided a pick-up cartridge having a record engaging stylus, and a tone arm pivotally supported at one end and having an opposite end adapted for pivotally mounting the pick-up cartridge for rotational movement with respect to a horizontal axis. The tone arm and cartridge assembly is counterbalanced to establish a prescribed record tracking force when the stylus is tracking the record. Means, cooperating with the counterbalanced tone arm and cartridge assembly and including a spring effectively coupled between the cartridge and the tone arm, are provided for resiliently establishing the cartridge in an equilibrium position, relative to the tone arm, while permitting the cartridge to pivot about the aforesaid horizontal axis relative to the tone arm during tracking of the record by the stylus. The spring exerts a force continuously tending to maintain the stylus in tracking engagement with the record despite transient upward or downward movement of the tone arm about its pivotal support for all pivotal positions of the cartridge relative to the tone arm.*

In accordance with an illustrative embodiment demonstrating objects and features of the present invention, there is provided a tone arm cartridge assembly which comprises a tone arm mounted for pivotal movement about a tone arm axis and appropriately counterbalanced in an amount to establish a prescribed record-tracking force. A cartridge including a record-tracking stylus is disposed within the tone arm and is mounted thereon for pivotal movement about a cartridge axis between playing and non-playing positions. Means are provided, conveniently in the form of a spring, to bias the cartridge to the non-playing position wherein the stylus is spaced from below a datum plane through the tone arm and cartridge axes. The stylus is disposed substantially in the datum plane when the cartridge is in the playing position to minimize frequency modulations incident to record tracking. The pivotal mount for the cartridge and the biasing spring provide a flexible or resilient support such that the cartridge tends to seek an equilibrium condition when in the playing position and is capable of receding into a stored position within the tone arm when the tone arm is depressed toward the record.

The above brief description, as well as further objects, features and advantages of the present invention, will be more fully appreciated by reference to the following detailed description of a presently preferred, but illustrative, embodiment according to the present invention, when taken in conjunction with the accompanying drawings, wherein.

Figures 1, 2, 3, 4:
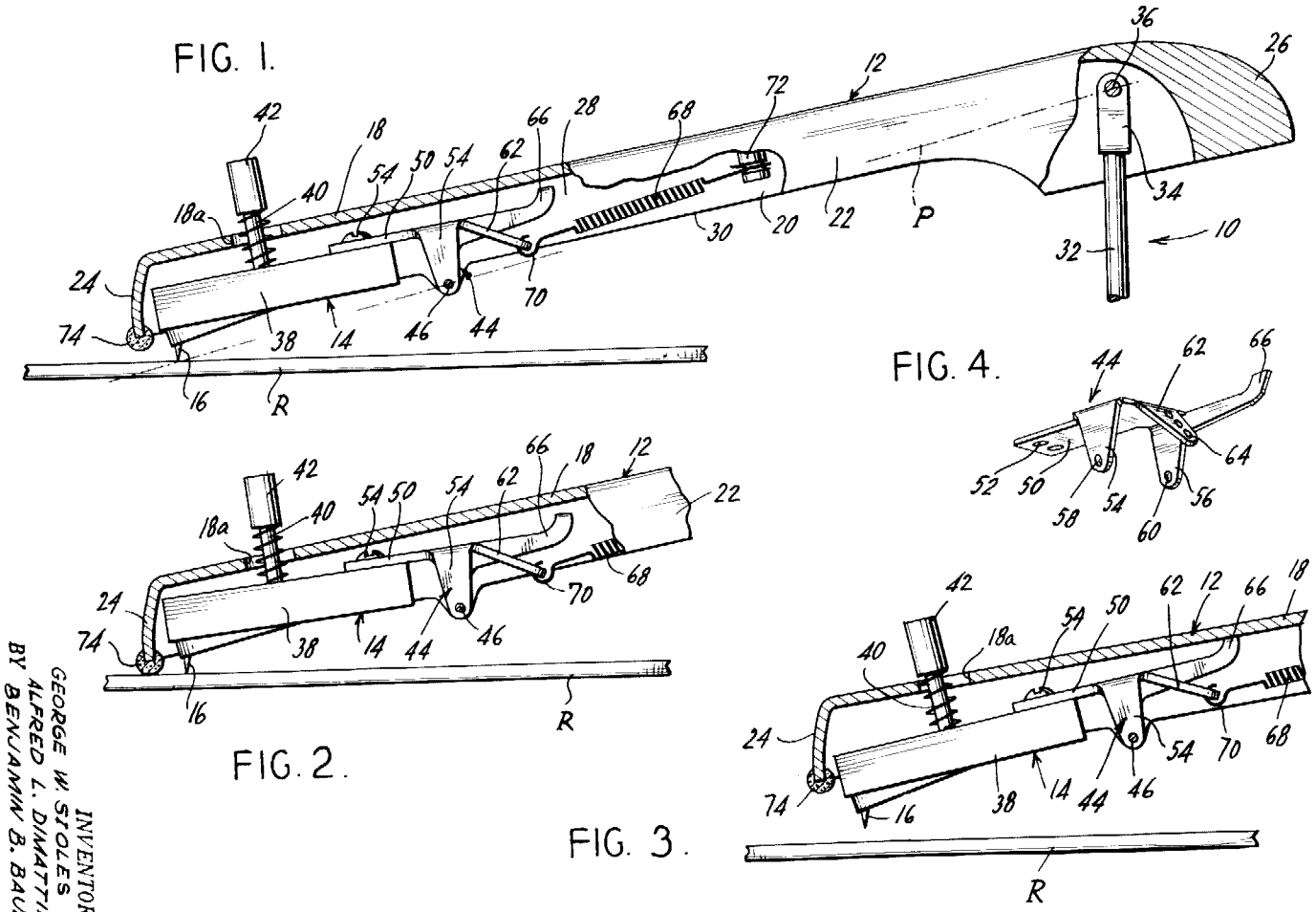
FIG. 1 is a side elevational view, with parts broken away and sectioned, showing a tone arm and cartridge assembly embodying features of the present invention and illustrated as tracking on a sound record or disc.
FIG. 2 is a fragmentary side elevational view similar to FIG. 1 but showing the cartridge of the tone arm assembly withdrawn into a stored or safety position within the tone arm, as might occur when the tone arm is dropped or a downward pressure is applied thereto.
FIG. 3 is a fragmentary side elevational view similar to FIG. 2 but showing the cartridge in the non-playing position relative to the tone arm, as when the tone arm is lifted off a record or supported on a tone arm post; and, FIG. 4 is a perspective view of an illustrative cartridge rocker bracket employed to pivotally or rockably mount the cartridge on the tone arm.

Referring now specifically to the drawings, there is, shown an illustrative tone arm and cartridge assembly, generally designated by the reference numeral 10, which embodies features of the present invention and includes an elongated tone arm 12 having a cartridge 14 mounted thereon. The cartridge 14 has at least one stylus 16 adapted to track in the groove of a sound record or disc, designated by the letter R.

The tone arm 12 includes an elongated body having a relatively flat top wall 18 depending side walls 20, 22, a front wall 24 and a rear wall 26 which cooperate to provide the hollow interior 28 having an open bottom 30. The rear wall 26 of the tone arm 12 is of increased thickness such as to serve as a counter-weight for the tone arm. This method of counterbalance is merely illustrative and may take many and varied forms, as is generally understood, including the provision of an auxiliary spring to supplement the counter-weight 26, or a total spring balancing arrangement. Preferably, however, the counterbalance is largely by means of an actual counterweight as illustrated herein so as to provide, as nearly as practicable, a balance situation so that vertical motions applied to the phonograph because of poor stability, shock excitation, random vibrations and the like will not adversely affect the operation of the tone arm 12.

Provision is made for mounting the tone arm 12 for pivotal movement vertically about a substantially horizontal tone arm axis. In this illustrative arrangement, the phonograph which is not shown but is of generally known construction and may be either a turntable or automatic changer, includes an upstanding tone arm support 32 having a bracket 34 on the upper end thereof which receives a transverse tone arm axle or pivot 36 providing a substantially horizontal tone arm axis about which the tone arm rocks incident to the placing of the tone arm on the record R and lifting of the tone arm from the record. The pivoting of the tone arm 12 at the tone arm axle 36 permits a wide range of vertical movement of the tone arm and enables a substantial stack of records to be accommodated on the record spindle of an automatic changer without impairing the action of the assembly 10. In addition to the one or more styli 16 appropriately dimensioned for the playback of long-play or regular-play records of the 33⅓, 45 or 78 r.p.m. types, the cartridge 14 includes a cartridge housing 38 and a turret post 40 which projects upwardly from the housing 38 and extends through a coaxial opening 18*a* in the top wall 18 of the tone arm 12. The turret post 40 carries a knob 42 which may be employed to rotate the turret of the cartridge 14 to move one or the other of the styli thereof to a position appropriate for the playback of the record R. A typical cartridge which may be employed in the present assembly is illustrated in application Serial No. 32,013, filed May 26, 1960, and entitled "Electromechanical Transducer" in the name of Benjamin B. Bauer, and assigned to the assignee of the present invention. However, it is to be understood that other types of cartridges, including those only appropriate for playback of one or the other types of recordings, may be employed in accordance with the teachings of the present invention.

Means are provided to mount the cartridge 14 for pivotal movement vertically about a substantially horizontal cartridge axis from a playing position as illustrated in FIG. 1 in one direction into a stored or safety position as illustrated in FIG. 2 and in the opposite direction into a non-playing position as illustrated in FIG. 3. In this illustrative embodiment, the pivotal or rockable mount for the cartridge 14 includes a cartridge rocker bracket 44 which is connected to the cartridge 14 and is pivotally supported by a transversely extending pin or pivot 46 extending between the opposite side walls 20, 22 of the tone arm 12 and appropriately secured thereto or journaled thereon. The horizontal pivot or axle 46 for the cartridge 14 should protrude as little as possible below the undersurface of the tone arm 12 to preclude inadvertent contact between the axle 46, or the mounting assembly contiguous thereto, with the surface of the record R. The cartridge rocker bracket 44, shown in detail in FIG. 4, includes a main mounting plate 50 having one or more openings 52 which receive the mounting screws 54 (see FIG. 1) for securing the cartridge housing 38 to the mounting plate 50, opposed depending ears 54, 56 having transversely aligned axle or pin openings 58, 60 through which the cartridge axle or pivot 46 extends (see FIG. 1), a rearwardly projecting tongue 62 having a number of spaced openings 64 therein adapted to receive the hook-shaped end of a biasing spring (as will be described), and a rearwardly projecting stop 66 substantially coplanar with the depending ear 56 and adapted to engage the undesurface of the top wall 18 of the tone arm 12 to establish the non-playing *or lower limiting* position (see FIG. 3). It will be appreciated that the cartridge rocker bracket as illustrated herein is typical of a wide variety of bracketing arrangements which may be employed for pivotally mounting the cartridge 14 for pivotal movement vertically about a substantially horizontally extending transverse cartridge axis.

Means are provided for biasing the cartridge 14 into the non-playing position illustrated in FIG. 3 when the tone arm is lifted off the record and wherein the stylus 16 is disposed below a datum or reference plane which extends at an acute angle to the top wall 18 of the tone arm 12 and through the spaced and parallel tone arm and cartridge axes 36, 46, such datum or reference plane being designated in FIG. 1 by the dot-dash lines and the notation P. The biasing is achieved in this illustrative embodiment by a coiled return spring 68 which has a hook-shaped end 70 at one end thereof selectively received in any one of the adjustment openings 64 on the tongue 62 of the rocker bracket and formed at its opposite ends with anchoring turns 70 secured to a plug 72 fixed to and depending from the top wall 18 of the tone arm 12, as shown in FIG. 1. It will be appreciated that the flexibly or resiliently mounted cartridge 14 tends to seek an equilibrium condition when tracking the record R. The return spring 68 permits the cartridge to move towards the stored [or] safety *or upper limiting* position illustrated in FIG. 2 when the tone arm 12 is depressed toward the record R, accidentally or otherwise.

Preferably, the return or biasing spring 68 is arranged lengthwise of the tone arm 12 and is slightly distended in the non-playing or normal position illustrated in FIG. 3, *so that it exerts a force continuously tending to maintain the stylus in tracking engagement with the record despite transient upward or downward movement of the tone arm about its pivotal support for all pivotal positions of the cartridge relative to the tone arm.* Accordingly, the force which is exerted by the return spring 68 when the cartridge 14 is urged into the playing position illustrated in FIG. 1 or pushed into the stored or safety position illustrated in FIG. 2 by an external force increases rapidly and non-linearly as a function of the movement of a cartridge 14 from the FIG. 3 position through the FIG. 1 position and into the FIG. 2 position. Accordingly, the playing or equilibrium position, *in which the cartridge is intermediate the upper limiting or stored position and the lower limiting or non-playing position as* shown in FIG. *1* [2], is readily established. Further, there is relatively little danger that variations in manufacturing tolerance or relaxation of the return spring and like losses of adjustment which may occur during normal use will allow the protective lip or bead 74 to come into contact with the record in the normal playing position.

Although separate and independent means have been illustrated herein, for movably and resiliently mounting the cartridge 14, is will be appreciated that such movable and resilient mounting may be achieved by other equivalent means. For example, a mounting member of an appreciate spring sheet material may be formed to the appropriate configuration for resiliently mounting the cartridge to move about an effective cartridge axis. Accordingly, the use of the terms "resiliently mounting," "cartridge axis" and comparable expressions in the claims is intended to be construed broadly and in a manner consistent with the scope of the disclosure herein.

The various positions of the flexibly or yieldably mounted cartridge 14 and its movement will be readily discernible to the phonograph operator in that the turret shaft 40 and the knob 42 serves as a means external to the tone arm 12 for providing a visual indication of the relative position of the cartridge 14 in relation to the tone arm. The knob 42 follows the "floating action" of the cartridge as the same seeks its equilibrium position during playback of a record and as the cartridge moves to the limit positions illustrated in FIGS. 2 and 3.

As a feature of the invention, the parameters of the tone arm 10 are selected such that the stylus 16 is disposed substantially in the datum plane P when in the playing position to minimize frequency modulation and spurious signal generation during tracking of the record and in response to the inadvertent external vertical vibration imparted to the record player and to the cartridge. It will be appreciated that if the tone arm axis 36, the cartridge axis 40 and the stylus 16 were not approximately in a straight line, the tendency to the stylus to pivot or rock vertically incident to seeking its equilibrium position upon mechanical excitation thereof, would manifest itself in its tendency for the stylus 16 to move back and forth along the groove during record playing. This would cause a spurious signal generation by the cartridge 14 and detract from the optimum performance of the tone arm and cartridge assembly 10.

As a precautionary measure, and to preclude direct contact of the front wall 24 of the tone arm 12 with the surface of the record R, it is advantageous to provide a protective bead or lip 74 along the lower edge of the front wall 24 which protective bead or lip is preferably fabricated of a yieldable elastomeric material. When the tone arm 12 is depressed with a corresponding movement of the cartridge 14 into the retracted or safety position, as shown in FIG. 2, the protective bead or lip 74 contacts the record surface R and precludes the scratching thereof by the direct contact with the tone arm body.

In the actual set up of the tone arm and cartridge assembly 10, the counterweight 26 is adjusted to produce the required vertical tracking force for the stylus 16, which may be of the order of 2 to 3 grams. For an automatic changer, the counterweight 26 is designed of a configuration, weight, and in a position to produce a minimum change in the vertical tracking force incident to a change in the number of records received on the spindle of such automatic changer. The return spring 68 for the cartridge 14 is adjusted so that the stylue 16 will occupy a position substantially in the datum plane P when the record is in the playing position, as illustrated in FIG. 1. This adjustment also requires the proper location of the pivots relative to each other, as will be appreciated by those skilled in the art. The facility to make adjustments in the spring tension during use is provided through the series of spaced spring adjustment holes 64, any one of which may accommodate the hook-shaped end 70 on the spring 68. In a typical system, the tone arm was adjusted to produce a vertical tracking force of 2.5 grams when the tone arm is in the normal playing position illustrated in FIG. 1. Upon pressing the tone arm into the safety position illustrated in FIG. 2, wherein the protective beads 74 were in contact with the record R, and measuring the force between the record groove and the stylus, the total force was found to be of the order of 5.5 grams. This experimentally verifies that the maximum possible force on the record R due to accidentally depressing the tone arm 12 would be of an order less than the normal vertical tracking force used in present day commercial changers. The force necessary to deflect the cartridge 14 into its playing position increases rapidly with the vertical motion so that the stylus 16 will find its proper position in equilibrium, yet the force upon the record R is not excessive when the cartridge 14 is displaced into the retracted or safety position as a result of dropping or pressing the tone arm 12 against the record R. *In other words, the cartridge is normally maintained in an equilibrium tracking position, relative to the tone arm, intermediate the upper and lower limiting positions but pivotally retracts within the tone arm in response to application to the tone arm and cartridge assembly of a downward force materially greater than the tracking force.*

From the foregoing, it will be appreciated that there has been provided, in accordance with the present invention, an improved tone arm and cartridge assembly which assures the high fidelity reproduction of both monophonic and stereophonic recordings of sound, with built-in provision for the protection of the cartridge and/or of the record against damage incident to the accidental dropping of or downward pressure on the tone arm. Further, the floating or shock mounting for the cartridge is realized in a manner minimizing the possibility of frequency modulation of the recorded program material, as might otherwise occur if the stylus had a tendency to walk back and forth along the groove incident to tracking of the record.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What we claim is:

1. A tone arm and cartridge assembly comprising an elongated tone arm, means adjacent the rearward end of said tone arm for mounting said tone arm for pivotal movement about a substantially horizontal tone arm axis, means including a weight to the rear of said tone arm axis for counterbalancing said tone arm in an amount to establish a prescribed record-tracking force, a cartridge including a record-tracking stylus disposed within the forward end of said tone arm, means for mounting said cartridge on said tone arm for pivotal movement about a substantially horizontal cartridge axis between playing and non-playing positions, and means operatively connected to said cartridge and to said tone arm biasing said cartridge to said non-playing position wherein said stylus is disposed below a datum plane through said tone arm axis and said cartridge axis, said stylus being disposed substantially in said datum plane when in said playing position to minimize frequency modulation incident to record-tracking.

2. An improved tone arm and cartridge assembly comprising a support, a tone arm, means pivotally mounting said tone arm on said support for pivotal movement about a tone arm axis, a cartridge including a record-tracking stylus, means for counterbalancing said tone arm and establishing a stylus force, means pivotally mounting said cartridge on said tone arm for pivotal movement about a cartridge axis, and means for biasing said cartridge into a non-playing position wherein said stylus is disposed below a common plane through said tone arm axis and cartridge axis extending at an acute angle to said tone arm.

3. In combination, a tone arm, a counterweight at the rear end of said tone arm, means adjacent to and forwardly of said counterweight mounting said tone arm for pivotal movement vertical about a substantially horizontal tone arm axis, a cartridge disposed within said tone arm adjacent to and spaced from the front end thereof and including at least one record-tracking stylus, means mounting said cartridge for pivotal movement vertically about a substantially horizontal cartridge axis, said cartridge axis being disposed in relation to said tone arm axis to establish a datum plane at an angle to said tone arm, a spring operatively connected to said cartridge and to said tone arm for biasing said cartridge into a non-playing position with said stylus spaced below said datum plane, said cartridge receding into a playing position upon placement of said stylus into contact with a record and with said stylus disposed substantially in said datum plane.

4. In combination, a tone arm including top, side and front walls defining a hollow interior having an open bottom, a counterweight at the rear end of said tone arm, means adjacent to and forwardly of said counterweight mounting said tone arm for pivotal movement vertically about a substantially horizontal tone arm axis, a cartridge disposed within the hollow interior of said tone arm adjacent to and spaced from said front wall and including at least one record-tracking stylus, means mounting said cartridge for pivotal movement vertically about a substantially horizontal cartridge axis, said cartridge axis being disposed in relation to said tone arm axis to establish a datum plane at an angle to said top wall, a spring operatively connected to said cartridge and to said tone arm for biasing said cartridge into a non-playing position extending through said open bottom and with said stylus spaced below said datum plane, said cartridge receding into a playing position upon placement of said stylus into contact with a record wherein said stylus is disposed substantially in said datum plane, the biasing effect of said spring on said cartridge and the facility for pivotal movement about said cartridge axis providing a floating mount for said cartridge affording at least some isolation from random movement imparted to said tone arm during playing of a record, and a resilient protective bead on the front end of said tone arm, said stylus being pivoted upward of said bead upon shock contact thereof with a record.

5. A tone arm and cartridge assembly comprising a tone arm, means adjacent the rearward end of said tone arm for mounting said tone arm for pivotal movement about a tone arm axis, means for counterbalancing said tone arm in an amount to establish a prescribed record-tracking force, a cartridge including a record-tracking stylus disposed within the forward end of said tone arm, means for mounting said cartridge on said tone arm for pivotal movement about a cartridge axis between playing and non-playing positions, a spring operatively connected to said cartridge and to said tone arm biasing said cartridge to said non-playing position wherein said stylus is spaced from a datum plane through said tone arm axis and said cartridge axis, said datum plane extending to an acute angle to said tone arm, said stylus being disposed substantially in said datum plane when in said playing position to minimize frequency modulation incident to record tracking, the mounting for said cartridge and said spring providing a flexible mount such that said cartridge tends to seek an equilibrium condition when in said playing position, and a resilient protective bead on the front end of said tone arm, said stylus being pivoted upwardly of said bead upon shock contact thereof with a record.

6. A tone arm and cartridge assembly comprising a tone arm, means adjacent the rearward end of said tone arm for mounting said tone arm for pivotal movement about a tone arm axis, means for counterbalancing said tone arm in an amount to establish a prescribed record-tracking force, a cartridge including a record-tracking stylus disposed within the forward end of said tone arm, means for mounting said cartridge on said tone arm for pivotal movement about a cartridge axis between playing and non-playing positions, a spring operatively connected to said cartridge and to said tone arm biasing said cartridge to said non-playing position wherein said stylus is spaced downwardly from a datum plane through said tone arm and cartridge axes, said stylus being disposed substantially in said datum plane when in said playing position to minimize frequency modulation incident to record tracking, the mounting for said cartridge and said spring providing a flexible mount such that said cartridge tends to seek an equilibrium condition when in said playing position, and means for blocking pivotal movement of said cartridge out of said non-playing position in a direction away from said playing position.

7. A tone arm and cartridge assembly for playback of a record comprising an elongated tone arm, means at one end of said tone arm mounting said tone arm for pivotal movement in a vertical plane about a substantially horizontal tone arm axis, a cartridge having a stylus disposed within said tone arm adjacent the other end thereof, means mounting said cartridge for pivotal movement in a vertical plane and in one direction about a substantially horizontal cartridge axis from a stored position with said tone arm into a playing position, and for further pivotal movement in said one direction from said playing position into a non-playing position, and means biasing said cartridge into said non-playing position wherein said stylus is disposed below a datum plane through said tone arm and cartridge axes, the biasing effect of said last named means being such as to maintain said stylus when tracking said record substantially in said datum plane with said cartridge in said playing position, said cartridge moving in a direction opposite to said one direction toward said stored position when said tone arm is depressed toward said record.

8. A tone arm and cartridge assembly for a record comprising an elongated tone arm, means at one end of said tone arm mounting said tone arm for pivotal movement vertically about a substantially horizontal tone arm axis, a cartridge having a stylus disposed within said tone arm adjacent the other end thereof, means mounting said cartridge for pivotal movement vertically about a substantially horizontal cartridge axis from a stored position within said tone arm into a playing position and for further pivotal movement from said playing position into a non-playing position, means biasing said cartridge into said non-playing position wherein said stylus is disposed below a plane through said tone arm and cartridge axes, the biasing effect of said last named means being such as to maintain said stylus when tracking said record substantially in said plane with said cartridge in said playing position, said cartridge moving toward said stored position when said tone arm is depressed toward said record, and a counterweight for said tone arm and cartridge assembly of a magnitude to establish a predetermined vertical tracking force between said stylus and said record.

9. A tone arm and cartridge assembly for a record comprising a tone arm, means mounting said tone arm for pivotal movement about a horizontal tone arm axis, a cartridge having a stylus, means mounting said cartridge for pivotal movement in a vertical plane about a horizontal cartridge axis from a retracted position within said tone arm into a playing position and for further pivotal movement from said playing position into a non-playing position, means biasing said cartridge into said non-playing position wherein said stylus is disposed below a datum plane through said tone arm and cartridge axes, the biasing effect of said last named means being such as to maintain said stylus when tracking said record substantially in said datum plane with said cartridge in said playing position.

10. A tone arm and cartridge assembly for a record comprising an elongated tone arm, means at one end of said tone arm mounting said tone arm for pivotal movement vertically about a substantially horizontal tone arm axis, a cartridge having a stylus disposed within said tone arm adjacent the other end thereof, means mounting said cartridge for pivotal movement vertically about a substantially horizontal cartridge axis from a stored position within said tone arm into a playing position and for further pivotal movement from said playing position into a non-playing position, means biasing said cartridge into said non-playing position wherein said stylus is disposed below a plane through said tone arm and cartridge axes, the biasing effect of said last named means being such as to maintain said stylus when tracking said record substantially in said plane with said cartridge in said playing position, said cartridge tending to seek equilibrium when tracking said record and moving toward said stored position when said tone arm is depressed toward said record, and means external to said tone arm and operatively connected to said cartridge providing a visual indication of the pivotal movement of said cartridge.

11. A tone arm and cartridge assembly according to claim 10 wherein said cartridge includes a turret shaft projecting upwardly through said tone arm serving as said means external to said tone arm for enabling manipulation of said cartridge and for providing said visual indication.

12. A tracking assembly for a phonograph mechanism comprising: an elongated tone arm having a rear portion and a forward portion provided with an apertured top wall, depending side walls and a front wall collectively defining a cartridge compartment of a given depth; a supporting structure connected to said rear portion for pivotally mounting said tone arm; a cartridge including at least one stylus positioned within said compartment to present said stylus in tracking relation to a record and having a depth dimension less than said given depth of said compartment; a cartridge-position indicator extending vertically from said cartridge through said aperture of asid compartment and having a cross section less than that of said aperture to permit free movement of said indicator; a mounting structure within said tone arm supporting said cartridge for pivotal movement about a horizontal axis between a first limiting position in which said cartridge and stylus are wholly within said compartment and a second limiting position in which said cartridge and stylus project from said compartment; a resilient member included in said cartridge mounting structure biasing said cartridge and stylus toward said second limiting position with a pressure which substantially compensates the pressure, said tracking assembly applies to said stylus during tracking of a record to maintain said cartridge and stylus floating in an equilibrium position intermediate said limiting positions; and a protective portion extending from and having a small cross section relative to one of said side and front walls of said compartment for spacing said tone arm from a record when said cartridge is in said first limiting position.

*13. In a phonograph for reproducing sound from a grooved record, the combination which comprises:*

*a pick-up cartridge provided with a record engaging stylus;*

*a tone arm pivotally supported at one end and having an opposite end adapted for pivotally mounting said cartridge for rotational movement with respect to a horizontal axis, the tone arm and cartridge assembly being counterbalanced to establish a prescribed record-tracking force when said stylus is tracking said record;*

*and spring means, cooperating with said counterbalanced tone arm and cartridge assembly and effectively coupled between said cartridge and said tone arm, for resiliently establishing said cartridge in an equilibrium position, relatively to said tone arm, while permitting said cartridge to pivot about said axis relative to said tone arm during tracking of said record by said stylus, said spring means being constructed and arranged to exert a unidirectional force continuously tending to maintain said stylus in tracking engagement with said record, despite transient upward or downward movement of said tone arm about its pivotal support, for all pivotal positions of said cartridge relative to said tone arm.*

*14. In a phonograph for reproducing sound from a grooved record, the combination which comprises:*

*a pick-up cartridge provided with a record engaging stylus;*

*a tone arm pivotally supported at one end and having an opposite end portion for receiving said pick-up cartridge;*

*means for pivotally mounting said cartridge at said opposite end portion of said tone arm for rotational movement with respect to a horizontal axis spaced from said cartridge toward said one end of said tone arm;*

*the tone arm and cartridge assembly being counterbalanced to establish a prescribed record-tracking force when said stylus is tracking said record;*

*and spring means, cooperating with said counterbalanced tone arm and cartridge assembly and effectively coupled between said cartridge and said tone arm, for resiliently establishing said cartridge in an equilibrium position, relative to said tone arm, while permitting said cartridge to pivot about said axis relative to said tone arm during tracking of said record by said stylus, said spring means being constructed and arranged to exert a unidirectional force continuously tending to maintain said stylus in tracking engagement with said record, despite transient upward or downward movement of said tone arm about its pivotal support, for all pivotal positions of said cartridge relative to said tone arm.*

*15. In a phonograph for reproducing sound from a grooved record, the combination which comprises:*

*a pick-up cartridge provided with a record engaging stylus;*

*a tone arm pivotally supported at one end and having an opposite end portion for receiving said pick-up cartridge;*

*bracket means for pivotally mounting said cartridge at said opposite end portion of said tone arm for rotational movement between upper and lower limiting positions with respect to a horizontal axis spaced from said cartridge toward said one end of said tone arm;*

*the tone arm and cartridge assembly being counterbalanced to establish a prescribed record-tracking force when said stylus is tracking said record;*

*and spring means, cooperating with said counterbalanced tone arm and cartridge assembly and effectively coupled between said cartridge and said tone arm, for resiliently establishing said cartridge in an equilibrium position, relative to said tone arm, intermediate said upper and lower limiting positions while permitting said cartridge to pivot about said axis relative to said tone arm during tracking of said record by said stylus, said spring means being constructed and arranged to exert a unidirectional force continuously tending to maintain said stylus in tracking engagement with said record, despite transient upward or downward movement of said tone arm about its pivotal support, for all pivotal positions of said cartridge relative to said tone arm but permitting pivotal retraction of said stylus within said tone arm in response to application to said tone arm and cartridge assembly of downward forces materially greater than said tracking force.*

*16. In a phonograph for reproducing sound from a grooved record, the combination which comprises:*

*a pick-up cartridge provided with a record engaging stylus;*

*an elongated tone arm pivotally supported at one end and having an opposite end portion provided with a*

*top wall, depending side walls and a front wall collectively defining a cartridge compartment, one of said walls being provided with an aperture;*

*bracket means for pivotally mounting said cartridge within said compartment for rotational movement between upper and lower limiting positions with respect to a horizontal axis spaced from said cartridge toward said one end of said tone arm;*

*the tone arm and cartridge assembly being counterbalanced to establish a prescribed record-tracking force when said stylus is tracking said record;*

*a cartridge-position indicator fixed in said cartridge and extending through said aperture for unimpeded movement with respect to said compartment as said cartridge pivots about said axis;*

*and spring means, cooperating with said counterbalanced tone arm and cartridge assembly and effectively coupled between said cartridge and said tone arm, for resiliently establishing said cartridge in an equilibrium position, relative to said tone arm, intermediate said upper and lower limiting positions while permitting said cartridge to pivot about said axis relative to said tone arm during tracking of said record by said stylus, said spring means being constructed*

*and arranged to a unidirectional force continuously tending to maintain said stylus in tracking engagement with said record, despite transient upward or downward movement of said tone arm about its pivotal support, for all pivotal positions of said cartridge relative to said tone arm but permitting pivotal retraction of said stylus within said tone arm in response to application to said tone arm and cartridge assembly of downward forces materially greater than said tracking force.*

References Cited by the Examiner

The following references, cited by the Examiner, are of record in the patented file of this patent or the original patent.

UNITED STATES PATENTS

| | | | |
|---|---|---|---|
| 2,351,948 | 6/1944 | Gay | 274—23 |
| 2,582,948 | 1/1952 | Caines | 274—23 X |
| 2,595,561 | 5/1952 | Baker | 274—37 X |
| 2,660,437 | 11/1953 | Harman | 274—23 |

NORTON ANSHER, *Primary Examiner.*

C. B. PRICE, *Assistant Examiner.*